(12) United States Patent  
Voeltzel

(10) Patent No.: US 6,730,389 B2
(45) Date of Patent: May 4, 2004

(54) COATED SUBSTRATE HAVING A FREQUENCY SELECTIVE SURFACE

(75) Inventor: Charles S. Voeltzel, New Kensington, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 10/269,388

(22) Filed: Oct. 11, 2002

(65) Prior Publication Data

US 2003/0080909 A1 May 1, 2003

Related U.S. Application Data

(60) Provisional application No. 60/351,055, filed on Oct. 25, 2001.

(51) Int. Cl.⁷ .............................. B32B 3/00; B32B 7/00; B32B 17/06; H01Q 1/32
(52) U.S. Cl. ...................... 428/195; 428/210; 428/432; 428/699; 428/701; 428/702; 343/711
(58) Field of Search .............................. 428/195, 210, 428/426, 432, 699, 701, 702; 343/711–713

(56) References Cited

U.S. PATENT DOCUMENTS

| 4,610,771 A | 9/1986 | Gillery ................. 204/192.1 |
| 4,716,086 A | 12/1987 | Gillery et al. ............. 428/630 |
| 4,746,347 A | 5/1988 | Sensi ....................... 65/94 |
| 4,792,536 A | 12/1988 | Pecoraro et al. ............. 501/70 |

(List continued on next page.)

FOREIGN PATENT DOCUMENTS

| DE | 195 08 042 | 10/1995 |
| DE | 195 13 263 | 10/1996 |
| EP | 0 531 734 | 3/1993 |
| WO | 96/31918 | 10/1996 |

OTHER PUBLICATIONS

International Search Report mailed Feb. 4, 2003.
U.S. patent application Ser. No. 60/351,055 filed Oct. 25, 2001.
U.S. patent application Ser. No. 09/058,440 filed Apr. 9, 1998.

*Primary Examiner*—Deborah Jones
*Assistant Examiner*—G. A. Blackwell-Rudasill
(74) *Attorney, Agent, or Firm*—Andrew C. Siminerio

(57) ABSTRACT

A method of making a frequency selective surface in an electromagnetic energy attenuating coating having an electrical resistance, including the steps of defining a first marking field and a first marking tolerance; defining a second marking field and a second marking tolerance; marking selected portions of the coating within the first marking field to define a first pattern; marking selected portions of the coating within the second marking field to define a second pattern such that the first and second patterns are spaced from one another by a distance at least equal to a combined tolerance of the marking devices; and marking a strip of the coating between the first pattern and the second pattern with at least one connector segment in a manner that substantially increases the resistance of the coating strip. A coated substrate having a frequency selective surface, includes a substrate; an electromagnetic energy attenuating coating having a resistance deposited over at least a portion of the substrate; a first pattern marked in the coating; and a second pattern marked in the coating adjacent the first pattern, wherein the first pattern is separated from the second pattern by a strip of the coating configured to substantially increase the resistance of the coating strip.

35 Claims, 3 Drawing Sheets

U.S. PATENT DOCUMENTS

| | | | |
|---|---|---|---|
| 4,806,220 A | 2/1989 | Finley | 204/192.27 |
| 4,834,857 A | 5/1989 | Gillery | 204/192.27 |
| 4,898,789 A | 2/1990 | Finley | 428/623 |
| 4,898,790 A | 2/1990 | Finley | 428/623 |
| 4,902,580 A | 2/1990 | Gillery | 428/623 |
| 4,948,677 A | 8/1990 | Gillery | 428/623 |
| 5,028,759 A | 7/1991 | Finley | 219/203 |
| 5,059,295 A | 10/1991 | Finley | 24/192.27 |
| 5,240,886 A | 8/1993 | Gulotta et al. | 501/70 |
| 5,264,685 A | 11/1993 | Eisermann | 235/382.5 |
| 5,385,872 A | 1/1995 | Gulotta et al. | 501/71 |
| 5,393,593 A | 2/1995 | Gulotta et al. | 428/220 |
| 5,821,001 A | 10/1998 | Arbab et al. | 428/623 |
| 5,867,129 A | 2/1999 | Sauer | 343/713 |
| 5,917,458 A * | 6/1999 | Ho et al. | 343/909 |
| 6,448,935 B2 * | 9/2002 | Fuchs et al. | 343/713 |

\* cited by examiner

COATED SUBSTRATE HAVING A FREQUENCY SELECTIVE SURFACE

CROSS-REFERENCE TO RELATED APPLICATION

This application claims the benefits of U.S. Application Ser. No. 60/351,055 filed Oct. 25, 2001, which is herein incorporated by reference in its entirety.

BACKGROUND OF THE INVENTION

1. Field of the Invention

This invention relates generally to a method of providing a frequency selective surface on a coated substrate and, in one embodiment, to a method of laser marking, melting, ablating, or deleting a frequency selective surface into a solar control coating deposited on an automotive windshield blank.

2. Technical Considerations

In automotive transparencies, such as windshields and back lights, antennas for the reception and/or transmission of radio frequency (RF) waves (such as FM, AM, UHF, VHF, cell phones, etc.) are carried on or incorporated into the transparency. These antennas can be formed by electrically conductive, transparent films deposited onto the transparency or by metal wires or strips attached to the transparency.

In order to reduce heat build-up in the interior of the vehicle, the transparency can also be coated with a solar control film that absorbs or reflects solar energy. Such solar control films are usually transparent, electrically conductive films. Typically, the solar control film and the antenna are incorporated into a transparency such that the solar control film is either on the same surface as the antenna or is positioned outboard of the antenna.

A drawback of the solar control films is that they also reflect radio waves, which can impair or degrade the reception of the underlying antenna. Additionally, it is not uncommon for portions of the antenna and the conductive solar control film to form a galvanic connection through the transparency (commonly referred to as "coupling"), which detunes the antenna and degrades its function.

In order to address the problems of RF energy reflection and coupling, the portion of the solar control film covering (i.e., outboard of) the antenna could be removed to facilitate the transmission of RF energy through that portion of the transparency to the antenna. However, removal of the solar control film would increase solar energy transmission into the interior of the vehicle, which can increase the vehicle temperature.

Another solution has been to cut slits in the solar control film to form what is commonly referred to as a frequency selective surface. By "frequency selective surface" is meant a coated surface which is relatively high in solar energy reflection and/or absorption but which also permits the passage of RF energy through the spaced narrow openings in the coated surface. For example, U.S. Pat. No. 5,364,685 discloses a panel in which a layer that is relatively high in radio wave reflectance is divided into a grid pattern having discontinuous square segments separated by a series of vertical and horizontal slits cut into the layer such that the width of each segment is not greater than ¹⁄₂₀ of the wavelength of the radio wave to pass through the frequency selective surface. WO 96/31918 and U.S. Pat. No. 5,867,129 disclose other types of frequency selective surfaces.

In these known systems, the slits permit the transmission of RF energy through the solar control film while the remaining portions of the film provide solar control protection for the interior of the vehicle. While such slit patterns are acceptable, problems arise in the fabrication of slit patterns. For example, to provide a large area slit pattern using a single deletion device, such as a laser, the laser would have to be very accurately traversed across the length and width of the coating, necessitating the use of complex precision movement devices. Alternatively, multiple lasers could be used to form adjacent portions of the pattern. However, a problem arises in this multi-laser process in that the adjacent lasers must be carefully and accurately aligned such that a slit, such as a horizontal slit, formed by one laser can be continued uninterrupted by the adjacent laser to form a single continuous slit in the coating. Due to the intrinsic inaccuracy of the lasers or in the event the adjacent lasers become misaligned, the pattern formed by one laser can be offset from the pattern formed by another laser such that adjacent slits are not continuous, i.e., not aligned. This pattern offset degrades the effectiveness of the grid pattern by allowing relatively large areas of the conductive solar control coating to remain substantially intact, which can result in high RF energy reflectance and/or coupling with the adjacent area of the antenna, adversely affecting antenna performance.

Therefore, it would be advantageous to provide a method of making a frequency selective surface on a conductive coating that reduces or eliminates some of the problems described above.

SUMMARY OF THE INVENTION

The present invention provides a method of making a frequency selective surface in an electromagnetic energy attenuating coating having an electrical resistance, comprising: defining a first marking field and a first marking tolerance; defining a second marking field and a second marking tolerance; marking selected portions of the coating within the first marking field to define a first pattern; marking selected portions of the coating within the second marking field to define a second pattern such that the first and second patterns are spaced from one another by a distance at least equal to a combined tolerance of the marking devices; and marking a strip of the coating between the first pattern and the second pattern with at least one connector segment in a manner that substantially increases the resistance of the coating strip. In one nonlimiting embodiment, the coating strip marking comprises marking at least one connector segment within at least a portion of the coating strip interconnecting the first pattern and the second pattern. In another nonlimiting embodiment, the method further comprises depositing the coating on a substrate, combining the coated substrate with additional substrates to form a laminate, incorporating at least one antenna element into the laminate such that the at least one antenna element is spaced from the coating and adjacent to the first and second patterns.

The present invention also provides a method of making a frequency selective surface on a coated substrate, comprising: depositing a coating having a resistance on a substrate; forming a first pattern in the coating; forming a second pattern in the coating, wherein the first pattern and second pattern are separated by a strip of coating; and configuring the coating strip such that the resistance of the coating strip substantially increases.

The present invention further provides a coated substrate having a frequency selective surface, comprising: a substrate; an electromagnetic energy attenuating coating having a resistance deposited over at least a portion of the substrate; a first pattern marked in the coating; and a second pattern marked in the coating adjacent the first pattern, wherein the first pattern is separated from the second pattern by a strip of the coating configured to substantially increase the resistance of the coating strip. In one nonlimiting embodiment of the invention, the substrate further comprises at least one connector segment extending from at least in close proximity to the first pattern, through at least a portion of the coating strip to at least in close proximity to the second pattern. In another nonlimiting embodiment, the substrate is a laminated transparency comprising at least one glass ply and further comprising at least one antenna spaced from the coating and adjacent to the first pattern and second pattern.

DESCRIPTION OF THE INVENTION

Figure 1:
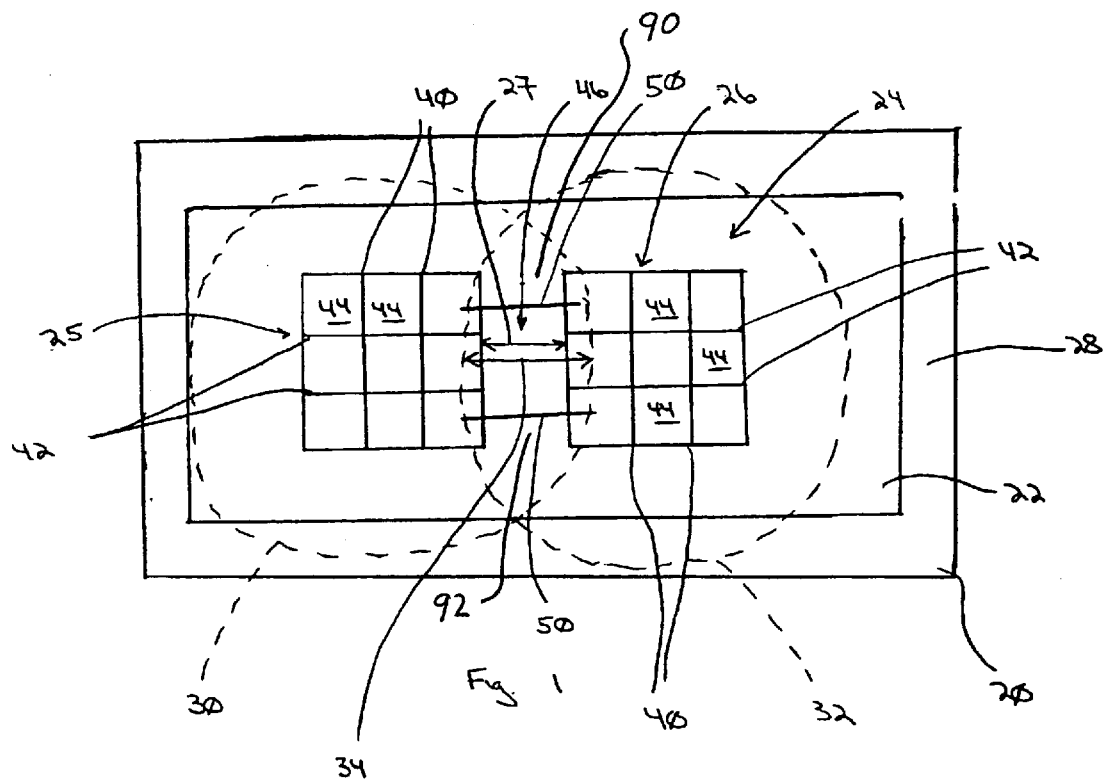
FIG. 1 is a schematic plan view (not to scale) depicting a method of marking a frequency selective surface into a coating on a substrate incorporating features of the invention.

As used herein, spatial or directional terms, such as "inner", "outer", "above", "below", "top", "bottom", and the like, relate to the invention as it is shown in the drawing figures. However, it is to be understood that the invention can assume various alternative orientations and, accordingly, such terms are not to be considered as limiting. Further, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims are approximations that can vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to be inclusive of the beginning and ending range values and to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10. Further, as used herein, the terms "deposited over" or "provided over" mean deposited or provided on but not necessarily in surface contact with. For example, a coating "deposited over" a substrate does not preclude the presence of one or more other coating films of the same or different composition located between the deposited coating and the substrate.

An exemplary method of making a frequency selective surface on a coated substrate in accordance with the present invention will now be described with particular reference to use with forming a frequency selective surface in a solar control coating on an automotive transparency. However, it is to be understood that the invention is not limited to use with solar control coatings but can be practiced with any coating that reflects, absorbs, or attenuates the transmission of electromagnetic energy in a frequency range, such as but not limited to RF energy, that is desired to pass through the coated substrate. Additionally, the invention is not limited to use with transparencies for land vehicles but can be practiced with any desired substrate, such as but not limited to architectural windows and transparencies for air, space, on the water, and underwater vehicles, just to name a few.

FIG. 1 shows a substrate 20 having a coating 22 deposited over at least a portion of the substrate 20. The coating 22 can be a coating that reflects, absorbs, or attenuates the transmission of electromagnetic energy in a desired frequency range, such as but not limited to RF energy in the AM, FM, UHF, VHF bands, or microwave energy. A frequency selective surface (FSS) 24 is formed in the coating 22 in accordance with the invention and as described below. The exemplary FSS 24 in FIG. 1 has a first pattern 25 spaced from a second pattern 26 by a distance indicated by arrowed line 27.

The substrate 20 is not limiting in the invention and can be of any dielectric material having any desired characteristics, such as opaque, translucent, transparent or substantially transparent substrates. By "substantially transparent" is meant having a visible light transmittance of 60% or greater. By "translucent" is meant having a visible light transmittance of greater than 0% to less than 60%. By "opaque" is meant having a visible light transmittance of 0%. Examples of suitable substrates include, but are not limited to, plastic substrates (such as polyacrylates, polycarbonates, and polyethyleneterephthalate (PET)); ceramic substrates; glass substrates; or mixtures or combinations thereof. For example, the substrate can be conventional untinted soda-lime-silica glass, i.e. "clear glass", or can be tinted or otherwise colored glass, borosilicate glass, leaded glass, tempered, untempered, annealed, or heat strengthened glass. The glass can be of any type, such as conventional float glass, flat glass, or a float glass ribbon, and can be of any composition having any optical properties, e.g., any value of visible transmission, ultraviolet transmission, infrared transmission, and/or total solar energy transmission. Types of glass suitable for the practice of the invention are described, for example but not to be considered as limiting, in U.S. Pat. Nos. 4,746,347; 4,792,536; 5,240,886; 5,385,872 and 5,393,593. For example, the substrate 20 can be a section cut from a float glass ribbon, a glass pane of an architectural window, a skylight, one pane of an insulating glass unit, a ply for an automotive transparency, such as a windshield, sidelight, back light, or sun roof, or an aircraft transparency, just to name a few.

The coating 22 can be any coating that reflects, absorbs, or otherwise attenuates the transmission of electromagnetic radiation of a desired frequency range. The desired frequency range can be, for example, microwave energy or, more typically, RF energy, such as in the conventional AM, FM, and/or television bands (e.g., UHF and/or VHF bands). For example, the coating 22 can be a solar control coating deposited over at least a portion of a surface 28 of the substrate 20. As used herein, the term "solar control coating" refers to a coating which modifies or affects one or more solar control properties, such as but not limited to emissivity, shading coefficient, transmission, absorption, reflection, etc., of the coated substrate on which it is deposited as compared to an uncoated substrate. The solar control coating can block, absorb, reflect, or filter one or more selected regions of the electromagnetic spectrum, such as but not limited to the UV region (less than 400 nm), the visible region (400 nm to 780 nm), or the IR region (greater than 780 nm). Nonlimiting examples of suitable solar control coatings are found in U.S. Pat. Nos. 4,898,789; 5,821,001; 4,716,086; 4,610,771; 4,902,580; 4,716,086; 4,806,220; 4,898,790; 4,834,857; 4,948,677; 5,059,295; and 5,028,759, and also in U.S. patent application Ser. No. 09/058,440. The solar control coating 22 can have one or more coating films of the same or different composition or functionality. As used herein, the terms "layer" or "film" refer to a coating region of a desired or selected coating composition. A "coating" is composed of one or more "layers" or "films".

The solar control coating 22 can be a single layer or multiple layer coating and can comprise one or more metals, metal oxides, nonmetals, semi-metals, semiconductors, and/or alloys, compounds, composites, combinations, or blends thereof. For example, the solar control coating 22 can be a single layer metal oxide coating, a multiple layer metal oxide coating, a non-metal oxide coating, or a multiple layer coating. Nonlimiting examples of suitable solar control coatings for the practice of the invention are commercially available from PPG Industries, Inc. of Pittsburgh, Pa. under the SUNGATE® and SOLARBAN® families of coatings. Such solar control coatings typically include one or more anti-reflective coating films comprising dielectric or anti-reflective materials, such as metal oxides or oxides of metal alloys, which are preferably transparent or substantially transparent to visible light. The solar control coating 22 can also include infrared reflective films comprising a reflective metal, e.g., a noble metal such as gold, copper or silver, or combinations or alloys thereof, and can further comprise a primer film or barrier film, such as titanium, as is known in the art, located over and/or under the metal reflective layer.

The solar control coating 22 can be deposited in any conventional manner, such as but not limited to magnetron sputter vacuum deposition (MSVD), chemical vapor deposition (CVD), spray pyrolysis (i.e., pyrolytic deposition), atmospheric pressure CVD (APCVD), low-pressure CVD (LPCVD), plasma-enhanced CVD (PECVD), plasma assisted CVD (PACVD), thermal or electron-beam evaporation, cathodic arc deposition, plasma spray deposition, and wet chemical deposition (e.g., sol-gel, mirror silvering, etc.).

In one exemplary embodiment of the invention, the FSS 24 is formed by two or more adjacent marking devices. As used herein, the terms "mark" or "marking" mean any operation to cut, delete, melt, ablate, remove or otherwise break the conductivity of the coating. As used herein, the term "marking device" refers to any device capable of marking portions of the coating 22, preferably without adversely affecting the underlying substrate 20. The marking devices can be of any desired type, such as by not limited to, mechanical cutters, masks, or lasers. A first marking field 30 of a first marking device (not shown) and an adjacent second marking field 32 of a second marking device (not shown) are schematically shown by dashed lines in FIG. 1 and represent areas within which the respective marking devices can mark, e.g., delete, the coating. Although not required, in one nonlimiting embodiment of the invention, the first and second marking devices are adjacent to each other. As will be appreciated by one skilled in the art, every marking device has an associated marking field defined by the distance of the marking device from the surface being marked and the performance parameters, e.g., degree of movement, accuracy of movement, etc., of the marking device. The marking fields 30, 32 do not have to represent the largest possible area within which the marking devices could operate, e.g., delete the coating. Rather, the marking fields 30, 32 could be a portion of the total possible area within which the associated marking device can operate. The marking fields 30, 32 thus represent areas within which an associated marking device can operate and within which a discrete pattern can be deleted by that marking device. The marking fields 30, 32 are schematically depicted as being circular in shape in FIG. 1. However, it is to be understood that the marking devices can define marking fields of any shape, such as but not limited to circular, square, oval, rectangular, triangular, etc., and adjacent marking fields can even be of different shapes. Also, it is to be understood that the dashed lines shown in FIG. 1 representing the marking fields 30, 32 are simply for purposes of explanation and represent the imaginary boundary within which the marking device(s) can operate. Such fields would not actually be visible on the coating 22.

Additionally, every marking device has an associated marking tolerance. By "marking tolerance" is meant the accuracy of the device, e.g., the ability of the marking device to repeatedly mark a shape, such as a line or line segment, at the same desired position on a substrate when the device is located at a given distance from the substrate. Such marking tolerances are typically expressed by a plus or minus ("±") value indicating how the device can vary or deviate from a desired position during operation. The marking tolerance of a device is typically provided by the manufacturer of the device. Alternatively, the marking tolerance of a device can be determined by repeatedly directing the device to mark a particular position ("set position") on a substrate and then measuring the variation of the actual marks from the set position. The sum of the absolute values of the marking tolerances of the first and second marking devices is defined herein as the "tolerance stack" or "combined tolerance" of the two marking devices. For example, if the marking tolerance of one marking device is ±0.3 mm and the marking tolerance of a second marking device is ±0.1 mm, the combined tolerance would be 0.4 mm (0.3 mm+0.1 mm=0.4 mm).

The first pattern 25 is marked by the first marking device (such as but not limited to a first laser) within the first marking field 30. The second pattern 26 is marked by the second marking device (such as but not limited to a second laser) within the second marking field 32. In the example shown in FIG. 1, the first and second patterns 25, 26 are both shown as grids formed by nonconductive vertical and horizontal line segments 40, 42, respectively, dividing the coating 22 into a plurality of quadrilateral coating areas 44. The cut line segments 40, 42 preferably extend through the coating 22 to the substrate surface 28 and form non-conductive or substantially non-conductive breaks or gaps between the conductive coating areas 44. It is to be understood that the invention is not limited to the formation of grid patterns but rather the line segments 40 and 42 can be any configuration, i.e. linear, curvilinear or a combination of both, to form patterns of any shape. Additionally, the coating areas 44 can be of different sizes and shapes between the two patterns 25, 26 and can even be of different sizes and shapes within the same pattern.

Contrary to previous methods, the FSS 24 of the invention is not formed by extending the vertical and horizontal line segments 40, 42 to form a single grid pattern across the entire surface to be patterned. Rather, individual, i.e. separate patterns are formed within the marking fields of the individual marking devices and the adjacent patterns 25, 26 are separated by an intermediate conductive coating area or strip 46 of the coating 22. In one nonlimiting embodiment, the distance 27 between the adjacent patterns 25, 26 is configured to be greater than the combined tolerance of the marking devices to ensure that the two patterns 25 and 26 will not overlap. For example, if the first marking device has a marking tolerance of ±0.25 mm and the second marking device has a marking tolerance of ±0.25 mm, the patterns 25 and 26 are marked such that the distance 27 between the two patterns 25, 26 is greater than 0.5 mm to ensure the two patterns 25, 26 will not overlap.

In one exemplary practice of the invention and as shown schematically in FIG. 1, the marking devices are positioned such that the marking field 30 of the first marking device overlaps the adjacent marking field 32 of the second marking device. In one nonlimiting embodiment, the marking devices are positioned such that the marking fields 30, 32 overlap by a distance shown by the arrowed line 34 of equal to or greater than the distance 27 between the two patterns 25, 26 plus the combined tolerance of the adjacent marking devices. For example, if the first marking device has a marking tolerance of ±0.25 mm, the second marking device has a marking tolerance of ±0.25 mm, and the patterns 25, 26 are to be separated by a distance 27 of 0.75 mm, the distance 34 should be at least 1.25 mm (i.e., 0.25 mm+0.25 mm+0.75 mm).

It was found that the intermediate conductive coating strip 46 between adjacent patterns 25 and 26 can be resonant at certain frequencies and retransmit signals that will interfere with the reception of an associated antenna element (the antenna elements to be discussed later in more detail). In addition, the coating strip 46 can also couple adjacent antenna elements, leading to degradable of the antenna's performance.

In order to avoid these conditions, the coating strip 46 between adjacent patterns is configured to substantially increase the resistance of the coating strip 46. By "substantially increases the resistance of coating strip 46" is meant that as a result of the shape and or other modifications to the coating strip 46, the resistance of coating strip 46 as measured from the upper end 90 of strip 46 to the lower end 92 of strip 46 at least doubles, e.g. at least triples, or increases by a factor of at least 5 or increases by a factor of at least 10.

In one nonlimiting embodiment of the present invention, the patterns 25 and 26 are be positioned relative to each other so as to configure the strip 46 in a manner such that it has an aspect ratio (ratio of the height of the strip to the width of the strip) of at least 50:1, for example 100:1 or 200:1 or 300:1. Such a narrow strip configuration will increase the resistance of the strip as measured from the top to the bottom of the strip, which in turn will reduce the coupling of the associated antenna elements by the strip 46, and also reduce the RF current flow generated in the conductive strip 46, thus improving reception.

Another way to avoid these conditions generated by strip 46 is to break the continuity of the strip in order to increase the strip resistance as measured from the top to the bottom of the strip. As discussed above, the increased resistance will reduce coupling and RF current flow in the strip, resulting in improved reception by the antenna elements. To this end, in one nonlimiting embodiment of the present invention, one or more connector segments 50 are marked in the strip 46 between adjacent first and second patterns 25, 26, e.g. by one of the first or second marking devices. In one nonlimiting embodiment, the segments 50 are discontinuous connector segments. By "discontinuous" is meant that the connector segments 50 are not aligned with or extensions of the line segments 42, which in the particular nonlimiting embodiment of the invention shown in FIG. 1, are horizontal segments. The connector segments 50 are positioned and configured such that the assemblage of segments 50 within intermediate conductive strip 46 interrupts the continuity of coating strip 46 and substantially increases the resistance of strip 46. The line segments 50 can be any configuration, such as but not limited to continuous straight or curved line segments, or a plurality of line segments, provided that the assemblage of line segments substantially increases the resistance of strip 46. In one nonlimiting embodiment of the present invention, a first end of a connector segment 50 extends at least in at least in close proximity to the first pattern 25, the segment extends through at least a portion of strip 46, and an opposing second end of a connector segment 50 extends at least in close proximity to the second pattern 26. In another nonlimiting embodiment, segment 50 extends to at least one coating area 44 of a pattern, and in another nonlimiting embodiment segment 50 extends to at least one coating area 44 of each adjacent pattern. In still another nonlimiting embodiment, segment 50 extends into at least one coating area 44 of a pattern, and in another nonlimiting embodiment segment 50 extends into at least one coating area 44 of each adjacent pattern. It should be appreciated that in such connector segment arrangements as discussed above, the segment 50 does not have to extend between adjacent coating areas of adjacent patterns, just merely from one coating area 44 of one pattern to one coating area 44 of an adjacent pattern.

In one nonlimiting embodiment of the invention, the connector segments 50 have a length of greater than the desired distance 27 between the two patterns 25, 26 plus the combined tolerance of the marking devices such that the connector segments 50 will extend at least to, and most likely into, each pattern 25, 26. For example, if both the first and second marking devices have marking tolerances of ±0.25 mm and the patterns 25, 26 are designed to be separated by a distance of 0.75 mm, the connector segments 50 should have a length greater than 1.25 mm (i.e. 0.25+0.25+0.75).

It should be appreciated that in embodiments of the present invention that include multiple segments 50 extending through a conductive coating strip 46, the segments 50 can be parallel, but are not required to be parallel. In one nonlimiting embodiment, segments 50 cross each other within coating strip 46 between adjacent patterns. In another nonlimiting embodiment, multiple segments 50 extend between the same coating areas 44 of the marked patterns.

Figure 2:
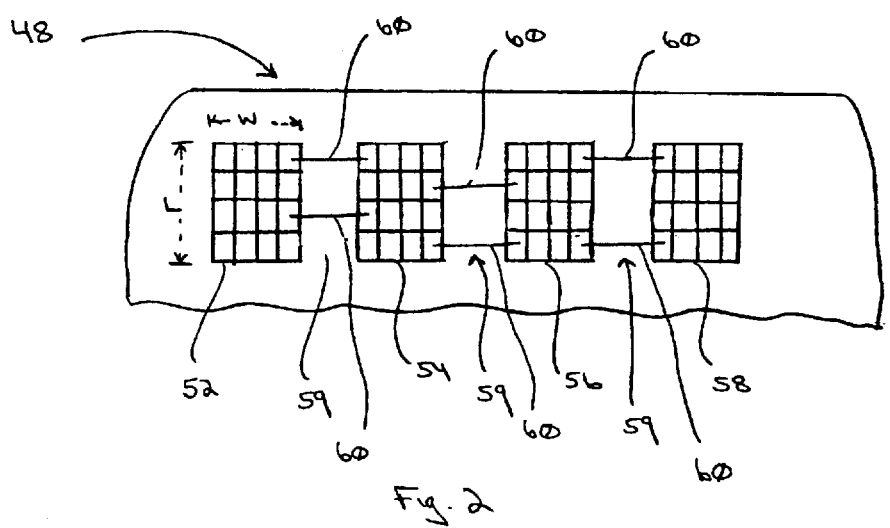
FIG. 2 is a plan view (not to scale) of a frequency selective surface of the invention formed on an automotive transparency.

In one nonlimiting embodiment of the present invention, a frequency selective surface 48 as shown in FIG. 2 was formed in a multilayered electrically conductive coating using four laser deletion devices with the following dimensions and tolerances: marking field=305 mm by 305 mm (with the corners of the field being unusable); marking tolerance=0.25 mm; distance between adjacent grid patterns=0.75 mm; each grid was 200 mm wide by 300 mm long; line spacing=3.5 mm; marking field overlap=2.5 mm; length of connector segments=1.75 mm.

FIG. 2 shows an FSS 48 having four adjacent grid patterns 52, 54, 56, 58 formed in accordance with the invention in the marking fields of four adjacent marking devices and separated by conductive areas 59. The grids are formed by quadrilateral shaped, conductive coating areas separated by non-conductive slits or line segments, as discussed earlier. One or more connector segments 60 extend between each adjacent pair of grid patterns 52, 54, 56 and 58 through the conductive areas 59 to form the FSS 48. In the nonlimiting embodiment of the invention shown in FIG. 2, at least one of the patterns, e.g., pattern 52, has a width W in the range of 50 mm to 500 mm, e.g., 100 mm to 500 mm, e.g., 200 mm to 400 mm, e.g., about 300 mm; and a length L in the range of 50 mm to 500 mm, e.g., 100 mm to 500 mm, e.g., 100 mm to 300 mm, e.g., 200 mm. In one nonlimiting embodiment, the individual coating areas (i.e., the squares making up the pattern) are in the range of 1 mm to 5 mm wide and about 1 mm to 5 mm long, e.g., 3 mm to 4 mm wide and 3 mm to 4 mm long, e.g., 3.5 mm wide by 3.5 mm long. In one nonlimiting embodiment, the conductive areas 59 can have a width of 0.1 mm to 2 mm, e.g., 0.2 mm to 1.5 mm, e.g., 0.25 mm to about 1.25 mm. In one nonlimiting embodiment, the connector segments 60 can have a length in the range of 1 mm to 5 mm, e.g., 1.5 mm to 4.5 mm, e.g., 2 mm to 4 mm, e.g., 2 mm to 3 mm.

Figure 4:
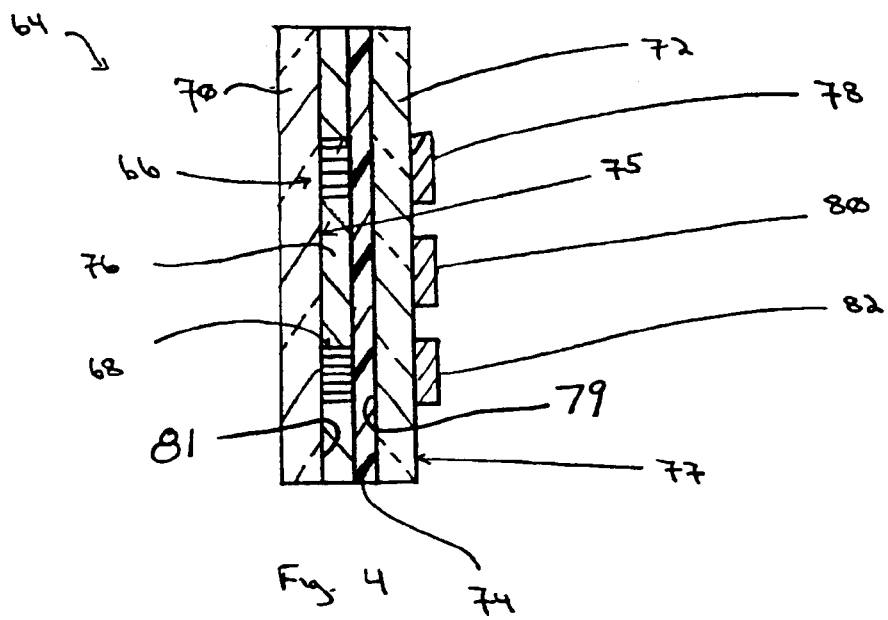
FIG. 4 is a sectional view (not to scale) taken along the line IV—IV of the laminated automotive transparency shown in FIG. 3 illustrating frequency selective surfaces and associated antenna elements.
Figure 3:
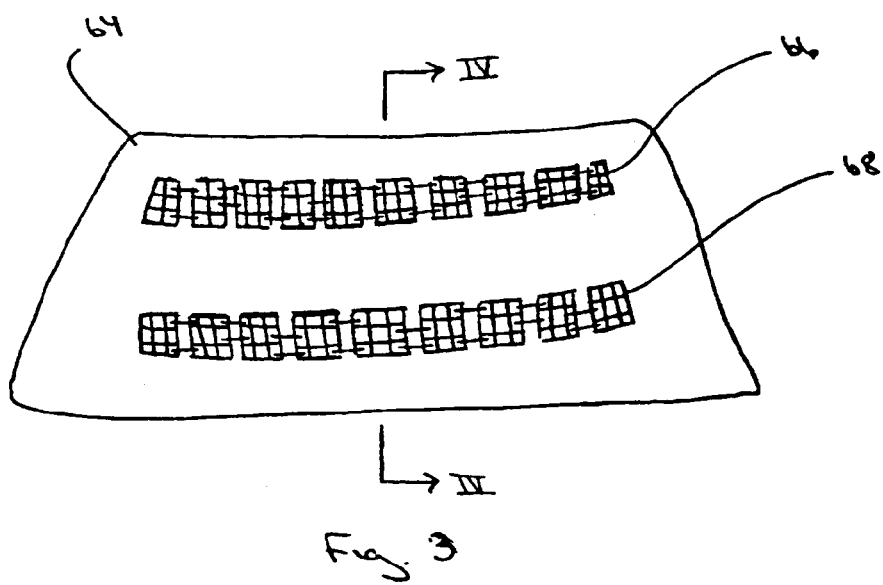
FIG. 3 is a front view (not to scale) of a laminated automotive transparency incorporating features of the invention.

FIGS. 3 and 4 show a laminated automotive transparency 64 having two FSS 66 and 68 formed in accordance with the invention incorporated into a structure having multiple substrates. More particularly and without limiting the present invention, as shown in FIG. 4, the laminated transparency 64 is formed by a first outer glass ply 70 spaced from a second inner glass ply 72 by a plastic interlayer 74, such as polyvinyl butyral. Prior to lamination, a surface 75 of the first ply 70 is coated with a solar control coating 76. The coating 76 is cut or marked as described above to form the two spaced frequency selected surfaces 66, 68 on the first ply 70, as shown in FIG. 3. Although not limiting in the present invention, in one embodiment, each of the upper FSS 66 and lower FSS 68 can be formed by two or more longitudinally adjacent patterns as described above and shown in FIG. 2. The FSS 66 and 68 can be made on a flat glass sheet that is subsequently bent and/or heat treated to form the first ply 70. Alternatively, the FSS 66 and 68 can be formed after the coated substrate is bent and/or heat treated to form the first ply 70.

One or more antennas can be provided on or within the transparency 64. The antennas can be of any conventional type, such as but not limited to electrically conductive transparent films and/or metal wires or strips. For example and without limiting the present invention, the antennas can be positioned on an inner surface 79 of the second ply 72 (i.e., between the first and second plies 70, 72) or within the interlayer 74 or on an outer surface 77 of the second ply 72 (e.g., facing the interior of the vehicle). But in any event, the antennas are spaced from coating 76 in which the frequency selective surfaces are formed, i.e. at least a portion of interlayer 74 and/or ply 72 extend between the antennas and coating 76. For example, in one embodiment, the second ply 72 includes one or more upper FM antennas 78, one or more middle AM antennas 80, and one or more lower FM or UHF antennas 82 located on the outer surface 77. Since AM frequencies are less susceptible to coupling by conductive solar control coatings, the coating 76 can remain intact over the area adjacent the AM antenna 80, i.e., no FSS is required to be cut in this area of the coating 76. However, an FSS of the invention can be deleted outboard of the AM antenna 80 if so desired. FSS 66 and 68 formed in accordance with the invention can be formed in the conductive solar control coating 76 adjacent the FM and UHF antennas 78 and 82, i.e. the electromagnetic signals passing through transparency 64 to antennas 78 and 82 must first pass through at least a portion of the frequency selective surfaces, to reduce coupling and increase reception by the antennas 78, 82.

Figure 5:
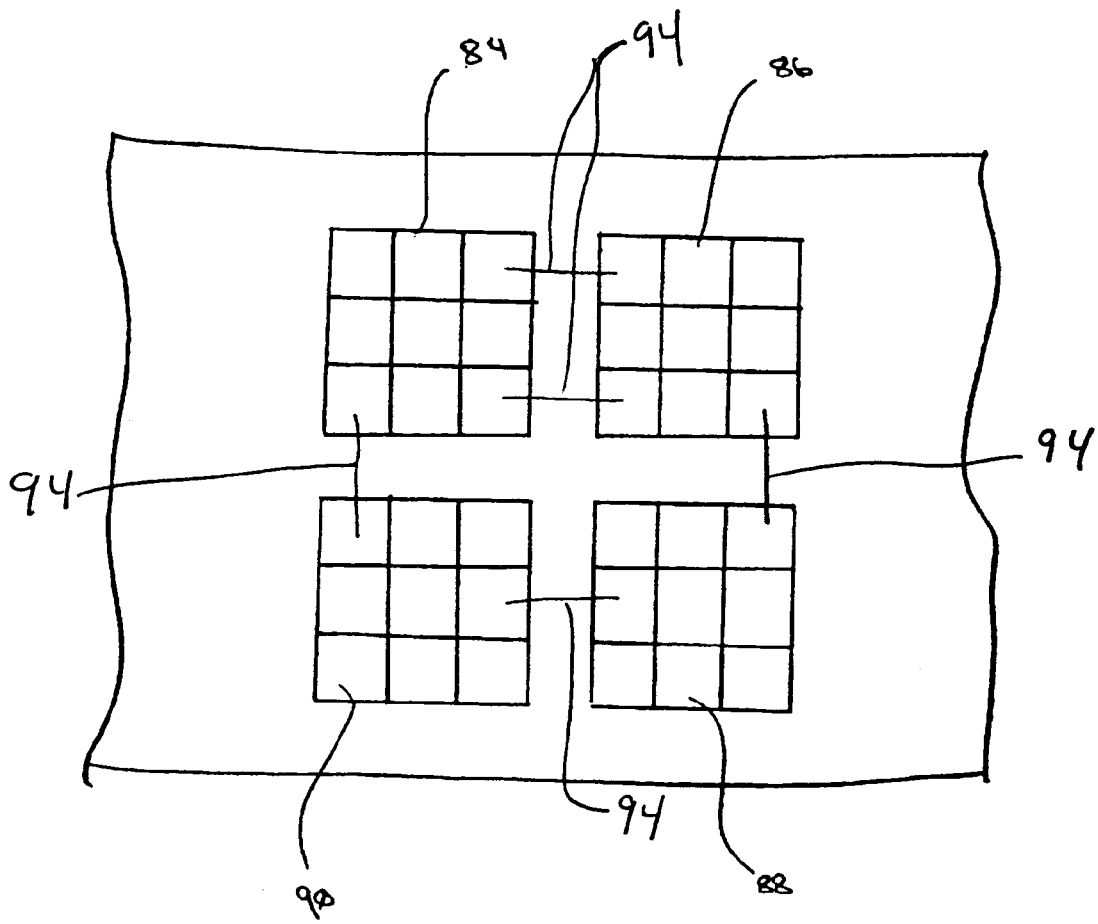
FIG. 5 is a plan view (not to scale) of an alternative frequency selective surface incorporating features of the invention.

While a substantially linear series of grid patterns is shown in FIG. 2, it is to be understood that the invention is not limited to such linear patterns. For example, FIG. 5 shows four patterns 84, 86, 88, 90 of the invention in a substantially rectangular formation with connector segments 94 extending between adjacent patterns.

Thus, in one exemplary practice of the invention, an FSS is formed by two or more individual patterns separately formed within the marking fields of one or more marking devices, with a conductive strip or area located between the adjacent patterns. Connector segments extend between the adjacent patterns to reduce the conductivity and RF energy reflectance of the conductive strips.

It should be appreciated that when multiple marking devices are used to mark one or more patterns as discussed above, the operation of the devices can be in sequence, i.e. a first device completes a first pattern before a second device starts the second pattern, or the operation of the devices can be simultaneous, i.e. two or more devices are marking two or more patterns at the same time, or a combination of the two, i.e. a first device begins to mark a first pattern while a second device is not marking and prior to completion of the first pattern, the second device begins to mark a second pattern.

Figure 6:
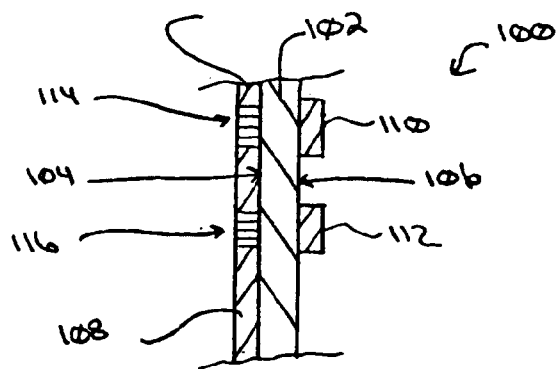
FIG. 6 is a sectional view (not to scale) similar to FIG. 4 of another coated substrate incorporating features of the invention.

While the exemplary embodiment discussed above was directed to the practice of the invention in forming a laminated transparency, the invention is not limited to use with laminated transparencies. For example, FIG. 6 shows a monolithic article 100 incorporating features of the invention. By "monolithic" is meant having a single structural support or ply 102, such as a glass sheet or any material discussed above with respect to the substrate 20. The ply 102 has a first major surface 104 and a second, opposite major surface 106. A coating 108, such as a solar control coating, can be deposited on all or a part of one of the major surfaces, e.g., surface 104. One or more conventional antennas, e.g., FM antennas 110 and 112, can be located on the other major surface 106. The antennas 110 and 112 can be, for example, conventional silver ceramic type antennas, silk-screen printed onto the surface 106.

One or more FSS, e.g., 114 and 116, can be made in the coating 104 by the process described above adjacent, i.e., outboard of, the antennas 110, 112 to improve the passage of electromagnetic energy, such as RF energy, through the coating 104 to the antennas 110 and 112.

In another aspect of the invention, one or more FSS can be made in a coating using a single marking device, such as a single laser. For example, the laser could be positioned such that a marking field is defined on a portion of the coating to be deleted. The defined marking field can represent all or a portion of the actual area within which the laser can operate. The laser can delete a pattern (first pattern) within the marking field, and then the substrate and/or laser can be moved relative to the other to position the marking field to a new position on the substrate and another pattern (second pattern) can be marked. The connector segments can be deleted during movement of the substrate. Alternatively, after the first pattern is marked, the substrate and/or laser can be moved relative to the other such that the marking field at the new position overlaps the area of the previous marking field (as described above with respect to FIG. 1) and the second pattern and connector segments can be deleted in the coating.

In one aspect of the invention, the separate patterns and connector segments present an aesthetically pleasing overall FSS, especially if utilized within a vision area of the transparency.

It will be readily appreciated by those skilled in the art that modifications can be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A coated substrate having a frequency selective surface, comprising:
    a substrate;
    an electromagnetic energy attenuating coating having a resistance deposited over at least a portion of the substrate;
    a first pattern marked in the coating; and
    a second pattern marked in the coating adjacent the first pattern, wherein the first pattern is separated from the second pattern by a strip of the coating configured to substantially increase the resistance of the coating strip.

2. The substrate of claim 1, wherein the coating strip has an aspect ratio of at least 50:1.

3. A coated substrate having a frequency selective surface, comprising:
    a substrate;
    an electromagnetic energy attenuating coating having a resistance deposited over at least a portion of the substrate;
    a first pattern marked in the coating;
    a second pattern marked in the coating adjacent the first pattern, wherein the first pattern is separated from the second pattern by a strip of the coating; and
    at least one connector segment extending from at least in close proximity to the first pattern, through at least a portion of the coating strip to at least in close proximity to the second pattern so as to substantially increase the resistance of the coating strip.

4. The substrate of claim 1, wherein the strip is configured to increase the resistance of the coating in the coating strip by a factor of at least five.

5. The substrate of claim 1, wherein the coating is a solar control coating.

6. The substrate of claim 5, wherein the solar control coating comprises two or more silver layers and two or more dielectric layers.

7. The substrate of claim 1, wherein the substrate is a glass substrate.

8. The substrate of claim 7, wherein the glass substrate is a laminated substrate comprising at least one glass ply.

9. The substrate of claim 8, wherein the laminate is a laminated transparency and further comprising at least one antenna spaced from the coating and adjacent to the first pattern and second pattern.

10. The substrate of claim 1, wherein the first and second patterns are grid patterns each comprising a plurality of conductive coating areas defined by substantially non-conductive line segments.

11. The substrate of claim 1, wherein the coating strip has a width of about 0.2 mm to about 1.5 mm.

12. The substrate of claim 11, wherein the coating strip has a width of about 0.25 mm to about 1.25 mm.

13. A coated substrate having a frequency selective surface, comprising:
    a substrate;
    an electromagnetic energy attenuating coating having a resistance deposited over at least a portion of the substrate;
    a first pattern marked in the coating;
    a second pattern marked in the coating adjacent the first pattern, wherein the first pattern is separated from the second pattern by a strip of the coating, and wherein the first and second patterns are grid patterns each comprising a plurality of conductive coating areas defined by substantially non-conductive line segments; and
    at least one connector segment extending from at least in close proximity to the first pattern, through at least a portion of the coating strip to at least in close proximity to the second pattern so as to substantially increase the resistance of the coating strip.

14. The substrate of claim 13, wherein the at least one connector segment extends from at least a conductive coating area of the first pattern to at least a conductive coating area of the second pattern.

15. The substrate of claim 14, wherein at least one of the at least one connector segments is a discontinuous connector segment.

16. The substrate of claim 14, wherein the connector segment has a length in the range of 1 mm to 5 mm.

17. The substrate of claim 14, wherein the substrate a laminated transparency comprising at least one glass ply and further comprising at least one antenna spaced from the coating and adjacent to the first pattern and second pattern.

18. The substrate of claim 14, wherein the conductive coating areas are substantially quadrilateral.

19. The substrate of claim 18, wherein the conductive coating areas are in the range of 2 mm to 5 mm long and in the range of 2 mm to 5 mm wide.

20. The substrate of claim 19, wherein the conductive coating areas are in the range of 3 mm to 4 mm long and in the range of 3 mm to 4 mm wide.

21. The substrate of claim 10, wherein each grid pattern has a length in the range of 100 mm to 500 mm and a width in the range of 100 mm to 500 mm.

22. The substrate of claim 21, wherein each grid pattern has a length in the range of 200 mm to 300 mm and a width in the range of 200 mm to 300 mm.

23. The substrate of claim 1, further comprising at least one additional pattern in the coating adjacent to and separated from the first coating or second coating by an additional strip of coating configured to substantially increase the resistance of the additional coating strip.

24. A transparency having a frequency selective surface, comprising:
    a transparent substrate;
    a transparent electromagnetic energy attenuating coating having a resistance deposited over at least a portion of the substrate;
    a first pattern marked in the coating; and
    a second pattern marked in the coating adjacent the first pattern, wherein the first pattern is separated from the second pattern by a strip of the coating configured to substantially increase the resistance of the coating strip.

25. The transparency of claim 24, wherein the substrate is laminated substrate comprising at least one glass ply.

26. The transparency of claim 24, wherein the coating strip has an aspect ratio of at least 50:1.

27. The transparency of claim 24, further comprising at least one connector segment extending from at least in close proximity to the first pattern, through at least a portion of the coating strip to at least in close proximity to the second pattern.

28. The transparency of claim 24, wherein the strip is configured to increase the resistance of the coating in the coating strip by a factor of at least five.

29. The transparency of claim 24, wherein the coating is a solar control coating.

30. The transparency of claim 24, wherein the substrate further comprises at least one antenna spaced from the coating and adjacent to the first pattern and second pattern.

31. The transparency of claim 24, wherein the first and second patterns are grid patterns each comprising a plurality of conductive coating areas defined by substantially non-conductive line segments.

32. The transparency of claim 24, wherein the coating strip has a width of about 0.2 mm to about 1.5 mm.

33. The transparency of claim 24, wherein the connector segment has a length in the range of 1 mm to 5 mm.

34. The transparency of claim 24, wherein each grid pattern has a length in the range of 100 mm to 500 mm and a width in the range of 100 mm to 500 mm.

35. The transparency of claim 24, further comprising at least one additional pattern in the coating adjacent to and separated from the first coating or second coating by an additional strip of coating configured to substantially increase the resistance of the additional coating strip.

* * * * *